(12) United States Patent
Diest et al.

(10) Patent No.: US 7,925,122 B2
(45) Date of Patent: Apr. 12, 2011

(54) SLOT WAVEGUIDE FOR COLOR DISPLAY

(75) Inventors: Kenneth A. Diest, Pasadena, CA (US);
Jennifer A. Dionne, Pasadena, CA (US);
Harry A. Atwater, S. Pasadena, CA (US); Henri Lezec, Bethesda, MD (US)

(73) Assignee: California Institute of Technology, Pasadena, CA (US)

( * ) Notice: Subject to any disclaimer, the term of this patent is extended or adjusted under 35 U.S.C. 154(b) by 394 days.

(21) Appl. No.: 12/215,330

(22) Filed: Jun. 25, 2008

(65) Prior Publication Data

US 2010/0002979 A1   Jan. 7, 2010

Related U.S. Application Data

(60) Provisional application No. 60/937,178, filed on Jun. 25, 2007, provisional application No. 61/070,524, filed on Mar. 24, 2008.

(51) Int. Cl.
*G02F 1/01* (2006.01)

(52) U.S. Cl. .................. 385/1; 385/8; 385/129

(58) Field of Classification Search .......... 385/1, 8, 385/129

See application file for complete search history.

(56) References Cited

U.S. PATENT DOCUMENTS

| 4,042,850 | A | * | 8/1977 | Ury et al. | 315/39 |
| 5,986,808 | A | | 11/1999 | Wang | |
| 7,456,383 | B2 | * | 11/2008 | Kim et al. | 250/226 |
| 7,693,363 | B2 | * | 4/2010 | Dionne et al. | 385/14 |
| 2004/0119397 | A1 | * | 6/2004 | Sakamoto | 313/495 |
| 2005/0258748 | A1 | * | 11/2005 | Kang et al. | 313/582 |
| 2006/0049757 | A1 | * | 3/2006 | Miyake et al. | 313/582 |

OTHER PUBLICATIONS

Atwater, Harry A., The Promises of Plasmonics, Scientific American, Apr. 2007, pp. 56-63, Scientific American, Inc.

* cited by examiner

*Primary Examiner* — Ellen Kim
(74) *Attorney, Agent, or Firm* — Christie, Parker & Hale, LLP

(57) ABSTRACT

A slot waveguide utilized as a color-selecting element. The slot waveguide includes a first layer of plasmon supporting material, the first layer being optically opaque and having an input slit extending through the first layer; a second layer of plasmon supporting material facing the first layer and separated from the first layer by a first distance in a first direction, the second layer being optically opaque and having an output slit extending through the second layer and separated from the input slit by a second distance extending along a second direction differing from first direction; a dielectric layer interposed between the first layer and the second layer, the dielectric layer having a real or complex refractive index; and a power source electrically coupled to the first layer and the second layer to apply an electrical signal for modulation of the real or complex refractive index of the dielectric layer.

20 Claims, 19 Drawing Sheets

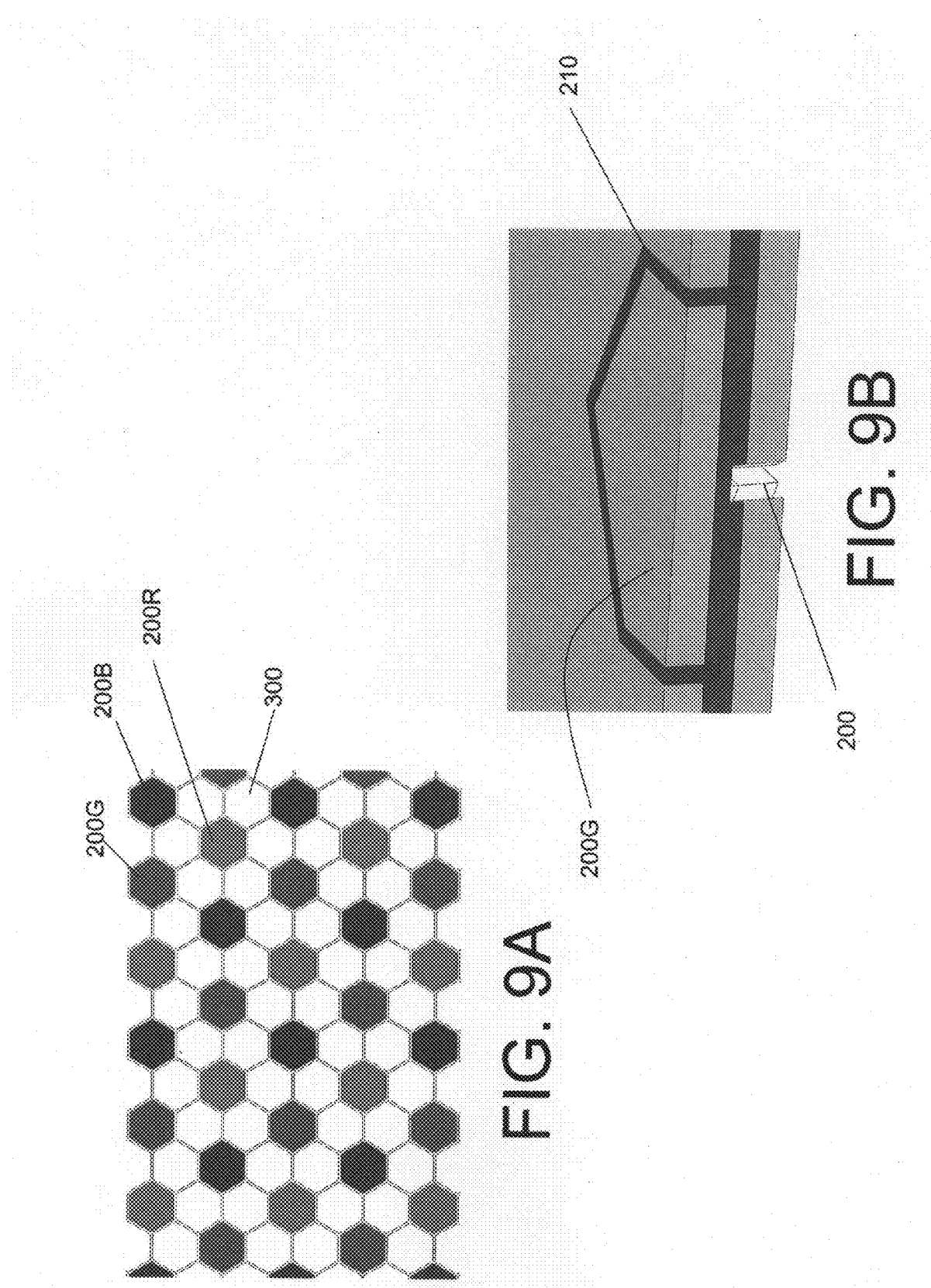

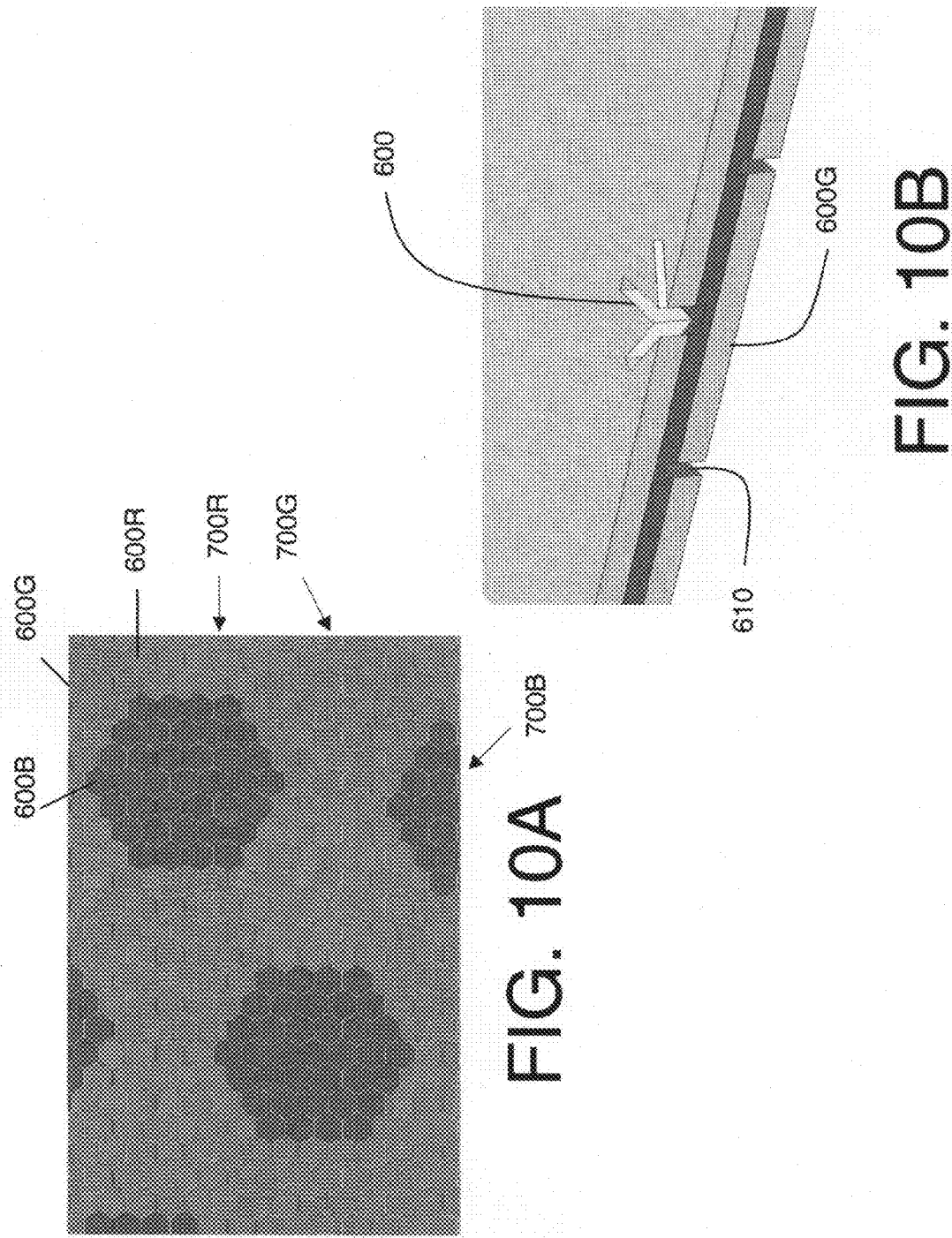

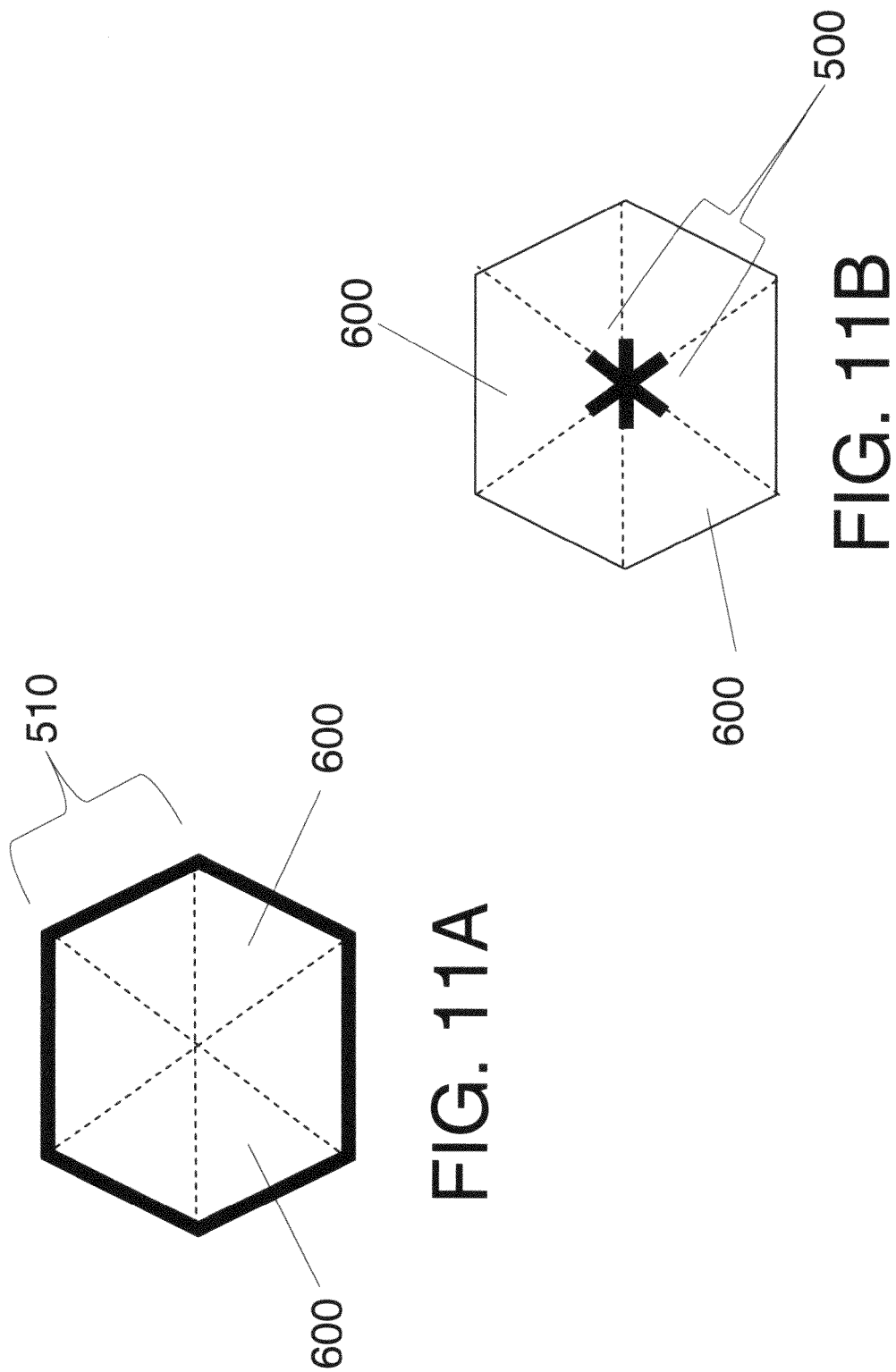

SLOT WAVEGUIDE FOR COLOR DISPLAY

CROSS-REFERENCE TO RELATED APPLICATION(S)

This application claims priority to and the benefit of U.S. Provisional Application No. 60/937,178, filed on Jun. 25, 2007, the entire content of which is incorporated herein by reference. In addition, this application claims priority to and the benefit of U.S. Provisional Application No. 61/070,524, filed on Mar. 24, 2008, the entire content of which is also incorporated herein by reference.

STATEMENT REGARDING FEDERALLY SPONSORED RESEARCH OR DEVELOPMENT

The U.S. Government has certain rights in this invention pursuant to Grant No. FA9550-04-1-0434 awarded by AFOSR and Grant No. DAAD19-01-1-0517 awarded by ARO—US Army Robert Morris Acquisition Center.

FIELD OF THE INVENTION

The invention relates generally to display technologies. More particularly, the invention relates to displays operating at visible wavelengths that employ resonant plasmonic and photonic modes in slot waveguides.

BACKGROUND OF THE INVENTION

Over the past few years, significant advances have been made in the field of display technologies. Low profile "flat-panel" displays have been realized using plasma, rear projection, organic light emitting diodes and most importantly liquid crystal technologies. To date, a significant portion of flat-panel computer monitors and virtually all laptop displays are based on liquid crystal display technology.

Liquid crystal displays exploit the properties of birefringent molecules to control the polarization of light. The molecules are placed between two cross-polarized filters and an applied electric field modifies the helicity of the molecule to either allow or inhibit white-light transmission through the two-filter combination. The emission wavelengths are controlled by color filters placed across each pixel.

Drawbacks associated with liquid crystal display technologies include a limited response time, limited viewing angles, limited color palette, and a high cost associated with the multi-layer film deposition over the active layer.

As such, there is a need to provide a full-color display that can address the limitation(s) of liquid crystal displays.

SUMMARY OF THE INVENTION

An aspect of an embodiment of the present invention is directed toward a photonic and plasmonic slot waveguide utilized in a full color display as a color-selecting element. That is, to address the limitation(s) of liquid crystal displays, an aspect of an embodiment of the present invention introduces a concept of a full-color display based on plasmonic and photonic resonances in slot waveguides.

More specifically, an embodiment of the present invention provides a slot waveguide utilized as a color-selecting element. The slot waveguide includes a first layer of plasmon supporting material, a second layer of plasmon supporting material, a dielectric layer, and a power source. The first layer is optically opaque and has an input slit extending through the first layer. The second layer faces the first layer and is separated from the first layer by a first distance in a first direction, and the second layer is optically opaque and has an output slit extending through the second layer and is separated from the input slit by a second distance extending along a second direction differing from first direction. The dielectric layer is interposed between the first layer and the second layer and has a real or complex refractive index. The power source is electrically coupled to the first layer and the second layer to apply an electrical signal for modulation of the real or complex refractive index of the dielectric layer.

In one embodiment, the input slit is adapted to receive a white light, and wherein the output slit is adapted to output colored light. Here, the second distance between the input slit and the output slit may be configured to select a color of the outputted light. The second distance may range from about 500 nm to about 5 um. The output slit may have an input end facing the first layer with a third distance therebetween and extending along the first direction, and the third distance may be configured to select a color of the outputted light.

In one embodiment, an interface between the first layer and the dielectric layer supports a first surface plasmon mode; an interface between the second layer and the dielectric layer supports a second plasmon mode; the first layer, the second layer, and the dielectric layer support one or multiple propagating waveguide modes; and a combination of the plasmon modes and the waveguide modes is utilized to select a color of the outputted light.

In one embodiment, the power source is a voltage source.

In one embodiment, the applied electrical signal is an applied voltage, and the real or complex refractive index of the dielectric layer is modulated by an electric field resulting from the applied voltage.

In one embodiment, the dielectric layer comprises a material capable of being modulated through an electro-optic effect. The dielectric material may be a ferroelectric material. The ferroelectric material may be lithium niobate, barium titanate, and/or lead titanate.

In one embodiment, the dielectric layer includes a material capable of being modulated though a carrier density modulation. The dielectric material may be an electro-optically-switchable semiconductor. The electro-optically-switchable semiconductor may be crystalline silicon.

In one embodiment, the first layer or the second layer is a metal layer. The metal layer includes a metal selected from the group consisting of gold, silver, copper, aluminum, tin, and combinations thereof.

In one embodiment, the first layer, the second layer, or the dielectric layer has a thickness ranging from about 100 nm to about 1 um.

In one embodiment, each of the first layer, the second layer, and the dielectric layer has the same shape.

In one embodiment, the slot waveguide further includes a notch filter between the first layer and the dielectric layer or between the second layer and the dielectric layer to interrupt passage of undesired wavelengths of light through the dielectric layer. The notch filter may include a plurality of notch plates for interrupting the passage of the undesired wavelengths of light through the dielectric layer.

A more complete understanding of the slot waveguide for color display will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

The patent or application file contains at least one drawing/picture executed in color. Copies of this patent or patent application publication with color drawing/picture(s) will be provided by the Office upon request and payment of the necessary fee.

The accompanying drawings, together with the specification, illustrate exemplary embodiments of the present invention, and, together with the description, serve to explain the principles of the present invention.

FIGS. 9A, 9B, 9C are schematic diagrams of a color display according to an embodiment of the present invention that employs photonic and plasmonic slot waveguides as color-selecting elements.

FIGS. 10A, 10B, 10C are schematic diagrams of a display according to another embodiment of the present invention that employs photonic and plasmonic slot waveguides as color-selecting elements.

FIGS. 11A and 11B are schematic diagrams of a color-selecting element according to an embodiment of the present invention that is formed by (or defined by) a plurality of photonic and plasmonic slot waveguides.

DETAILED DESCRIPTION

Figure 1:
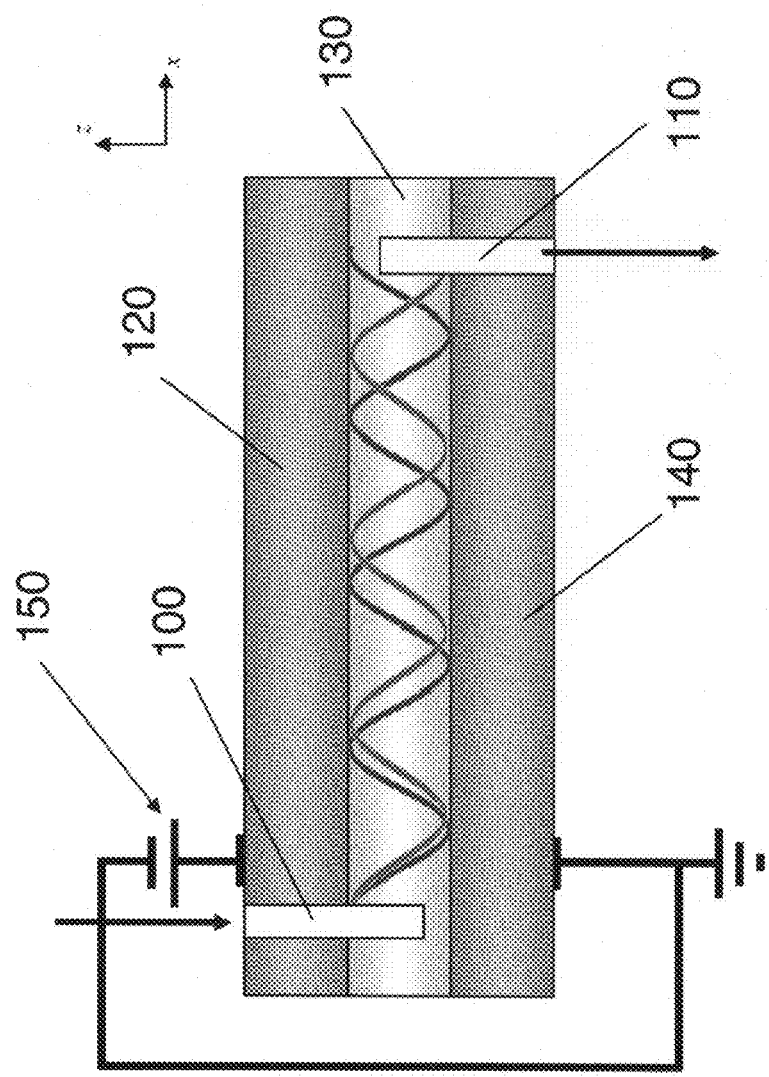
FIG. 1 is a schematic of a waveguide for a display according to an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the other element or be indirectly on the other element with one or more intervening elements interposed therebetween. Like reference numerals designate like elements throughout the specification.

Plasmons—specifically, surface plasmons—are coupled charge-density oscillations interfaced between a metal and a dielectric. As a hybrid photon-electron mode, plasmons are usually excited via slit, grating or prism-coupling of light into a metal/dielectric structure. Plasmons are characterized by short wavelengths and high field intensities at the metal/dielectric interface, making them ideal for manipulating the propagation, localization and emission properties of light on both the micro and nanoscale. Slot waveguides confine these modes in a dielectric core surrounded by metallic cladding layers on both sides.

A full-color display according to an embodiment of the present invention exploits the properties of plasmonic modes in a metallodielectric slot waveguide resonator. The dielectric layer is designed to be transparent in the visible range with a real or complex refractive index that can be tuned or controlled by an applied electric field. Examples of the dielectric layer include but are not limited to ferroelectric materials and electrooptic materials such as lithium niobate, barium titanate, and lead titanate. It has also been shown that highly strained centrosymmetric crystalline materials (such as single crystalline Si) also exhibit refractive indices that can be tuned by an applied electric field. This dielectric layer is then sandwiched between two plasmon-supporting thin film layers (cladding layers) that serve as top and bottom electrodes for the full-color display. Examples of this layer include but are not limited to gold, silver, copper and aluminum.

Referring to FIG. 1, a mechanism for color filtering applications is presented, using an active photonic and plasmonic waveguide. In one embodiment as shown, the photonic and plasmonic waveguide is a photonic and plasmonic slot waveguide utilized in a full color display as a color-selecting element. Here, the slot waveguide includes a first layer 120, a second layer 140, and a dielectric layer 130 interposed between the first layer 120 and the second layer 140. Both the first layer 120 and the second layer 140 are formed of a plasmon supporting material, and the dielectric layer has a real or complex refractive index. In addition, the first layer 120 is optically opaque and has an input slit 100 extending through the first layer 120. The second layer 140 faces the first layer 120 and is separated from the first layer 120 by a first distance in a first direction (e.g., z-direction). The second layer is also optically opaque and has an output slit 110 extending through the second layer 140 and is separated from the input slit 100 by a second distance extending along a second direction (e.g., x-direction) differing from the first direction.

Moreover, a power source (or an active power source) 150 is electrically coupled to the first layer 120 and the second layer 140 to apply an electrical signal for modulation of the complex refractive index of the dielectric layer 130. In one embodiment, the power source 150 is a voltage source. The applied electrical signal may be an applied voltage, and the real or complex refractive index of the dielectric layer is modulated by an electric field resulting from the applied voltage.

Further, in one embodiment, the first layer 120 or the second layer 140 is a metal layer. The metal layer may include a metal selected from the group consisting of gold, silver, copper, aluminum, tin, and combinations thereof. In one embodiment, the first layer 120, the second layer 140, or the dielectric layer 130 has a thickness ranging from about 100 nm to about 1 um. Also, in one embodiment, each of the first layer, the second layer, and the dielectric layer has the same shape.

In one embodiment and as shown in FIG. 1, the input and output slits 100 for light are respectively patterned into the first and second (cladding) layers 120, 140. These slits 100, 110 can be fabricated using a variety of suitable methods including focused ion beam milling and electron-beam/photo-lithography and etching. White light from a lamp or diode illuminates the first (cladding) layer 120 and is scattered from the input slit 100 into the dielectric layer 130. The light then propagates through the dielectric layer 130 and is coupled out of this layer 130 via the output slit 110 of the second (cladding) layer 140. As an example and depending on the location of the output slit 110 with respect to the input slit 100, a colored light (e.g., red, green, or blue) is outputted by the output slit 110 from the white light entering the input slit 100.

Figure 2:
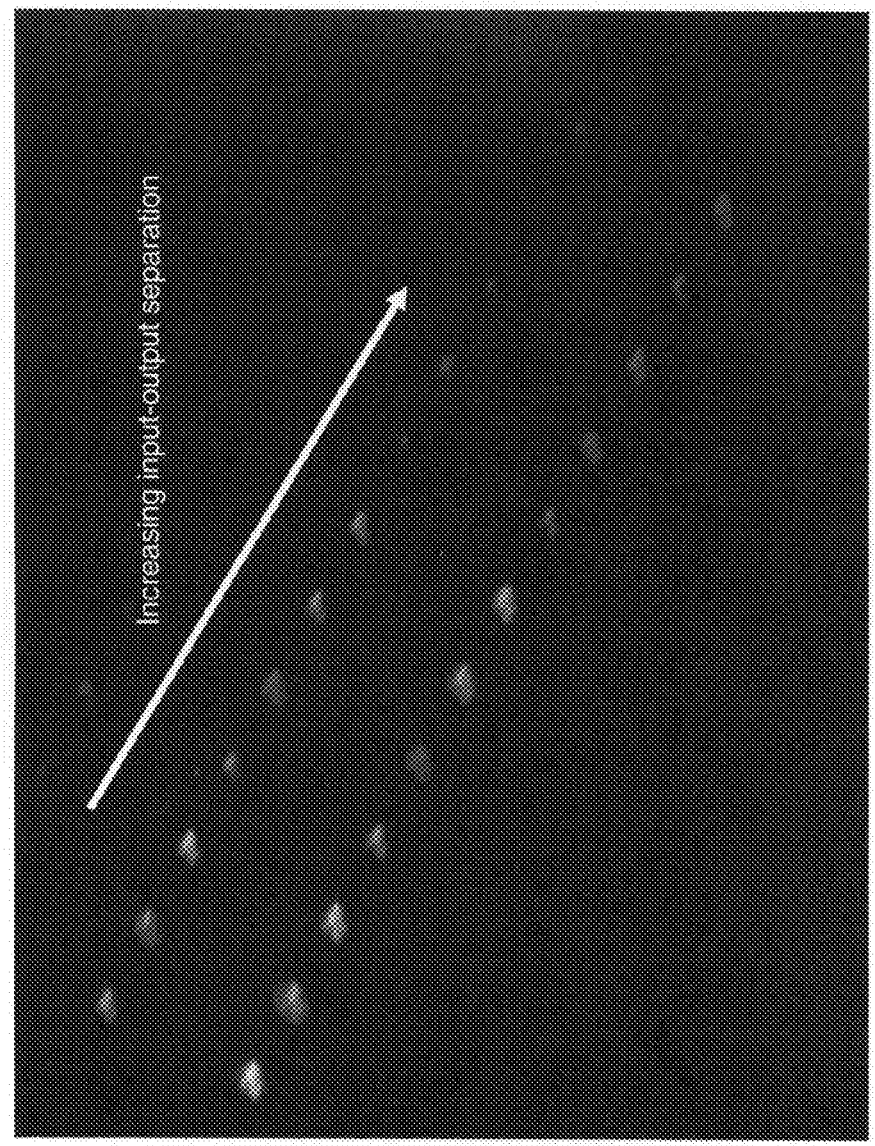
FIG. 2 is an experimental image of individual pixels of this invention, demonstrating that a full-color palette can be achieved in a waveguide as described above with respect to FIG. 1.

Modes of light in the waveguide include plasmonic modes as well as conventional photonic waveguide modes. Propagating waves resonate between the input and output slits 100, 110, which can act as Bragg reflectors. To enhance reflectivity of the wave, it is also possible to fabricate Bragg reflectors separate from and behind (outside the resonator cavity) the input and output slits 100, 110. By varying the separation between the input and the output slits 100, 110, the wavelength of the transmitted light can be varied over the entire range of the visible spectrum as for example shown in FIG. 2. That is, as shown in FIG. 2, depending on the location of the output slit 110 with respect to the input slit 100, a colored light (e.g., red, green, or blue) is outputted by the output slit 110 from the white light entering the input slit 100. In one embodiment, the distance of separation between the input and output slits 100, 110 ranges from about 500 nm to about 5 um.

In one embodiment, an interface between the first layer 120 and the dielectric layer 130 supports a first surface plasmon mode and an interface between the second layer 140 and the dielectric layer 130 supports a second plasmon mode. Here, the first layer 120, the second layer 130, and the dielectric layer 140 support one or multiple propagating waveguide modes and a combination of the plasmon modes and the waveguide modes is utilized to select a color of the outputted light.

In more detail, FIG. 2 demonstrates that a full-color palette can be achieved in a waveguide as described above with respect to FIG. 1. Here, in a particular embodiment of the waveguide, a 500-nm-thick dielectric layer is sandwiched between silver and gold cladding layers. The waveguide is then illuminated with white light from the input slit (or above) and variation of transmission wavelengths (colors)—depending on the input-output separation—can be observed as shown in FIG. 2.

In addition, referring now back to FIG. 1, when an electric field is applied by the power source 150 to the slot waveguide resonator structure as shown in FIG. 1 via the first and second (top and bottom cladding) layers 120, 140, the real or complex refractive index of the dielectric layer 130 can be modulated (or modified). As a result, the wavelength of light that is strongly transmitted through the device is shifted. Through a combination of dielectric materials (which determine the change in refractive index for a given applied field) and slit spacings, these devices can be designed to display any desired color. Furthermore, transmission can be suppressed such that the devised waveguide device displays no color. Suppression can occur though a variety of suitable methods including: shifting the emission into the ultra-violet or infrared regime, destructively interfering the mode with another plasmon or photon mode, or forcing the waveguide into cutoff (so that no modes are supported in the dielectric). Accordingly, a display can be fabricated where red, green, and blue devices are placed side-by-side and a resulting full-color pixel display is produced.

Figure 3:
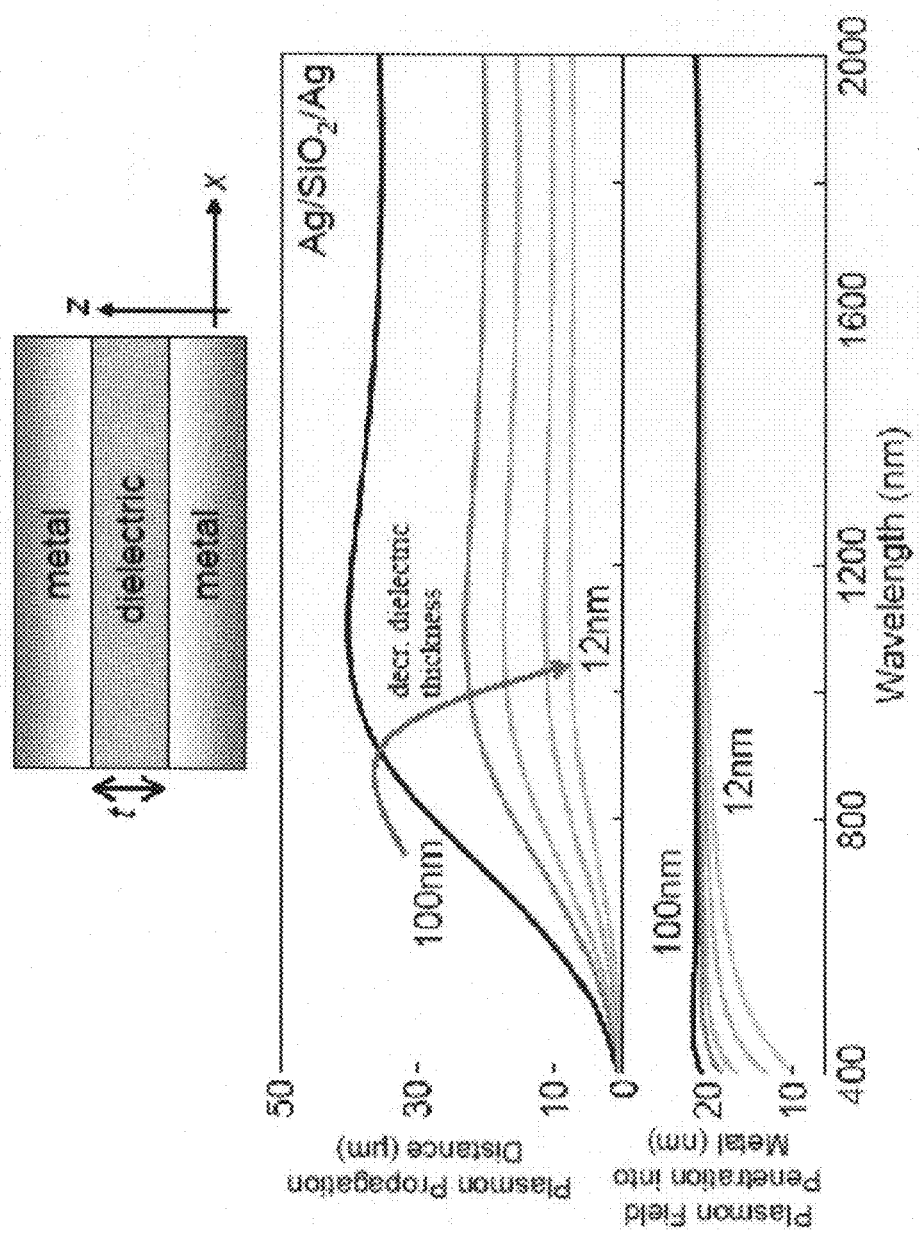
FIG. 3 is diagram showing that incoupling to plasmonic structures provides relatively long propagation lengths within relatively small modal volumes.

In more detail, FIG. 3 is diagram showing that incoupling to plasmonic structures provides relatively long propagation lengths within relatively small modal volumes. That is, referring to FIG. 3, metal/silicon/metal waveguide modeling shows that light can propagate to over 10-20 μm (in, e.g., x-direction) at an insulator thickness (t) of about 1550 nm.

In addition, a metal-insulator(dielectric)-metal (MIM) waveguide according to an embodiment of the present invention allows tuning of both the dispersion properties of the device as well as the resonance/filtering properties. Moreover, changing the MIM materials as well as their thicknesses and slit dimensions allows access to a large range of waveguide mode profiles.

Figure 4A:
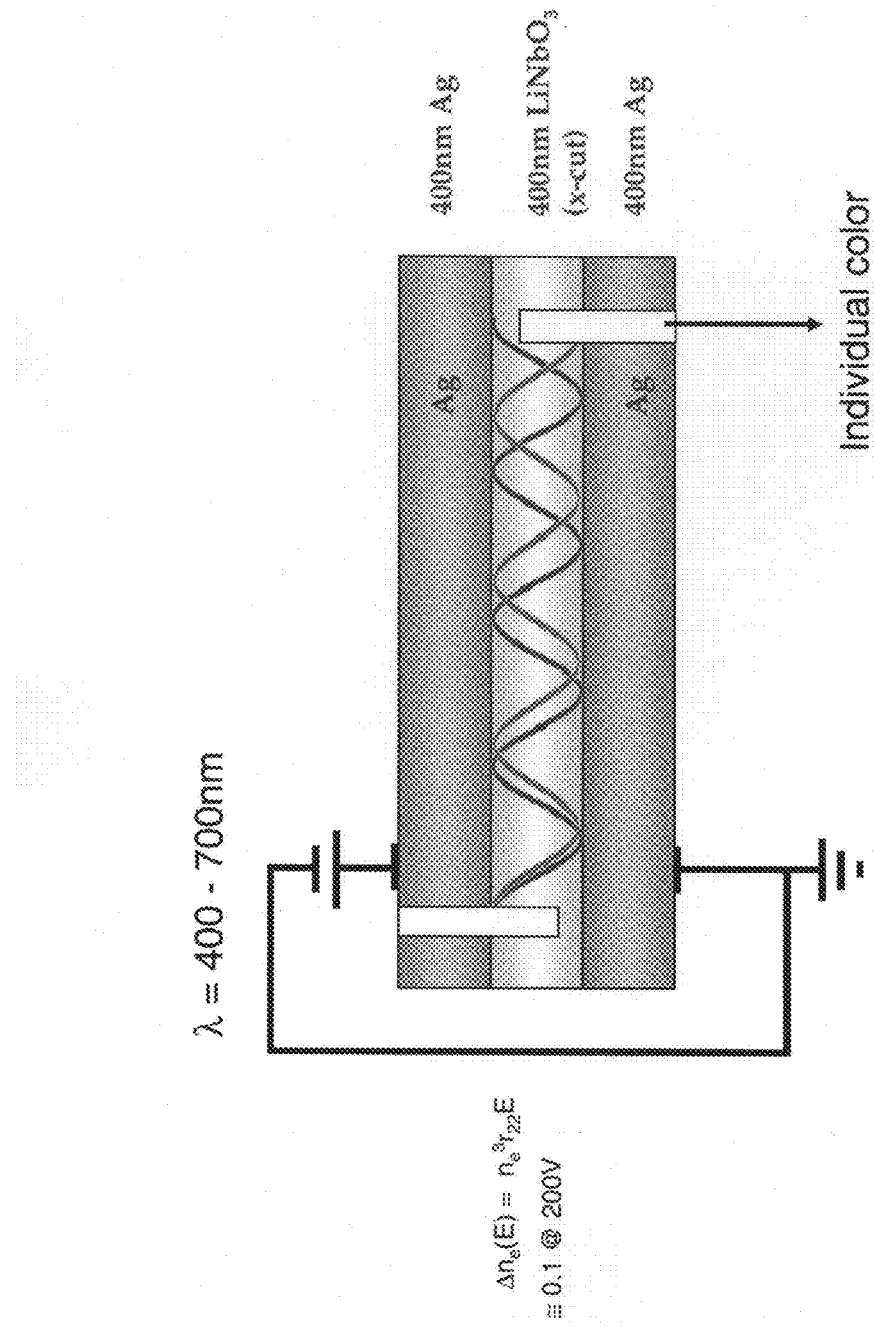
FIG. 4A is a schematic of a waveguide with a lithium niobate dielectric layer according to an embodiment of the present invention.
Figure 4B:
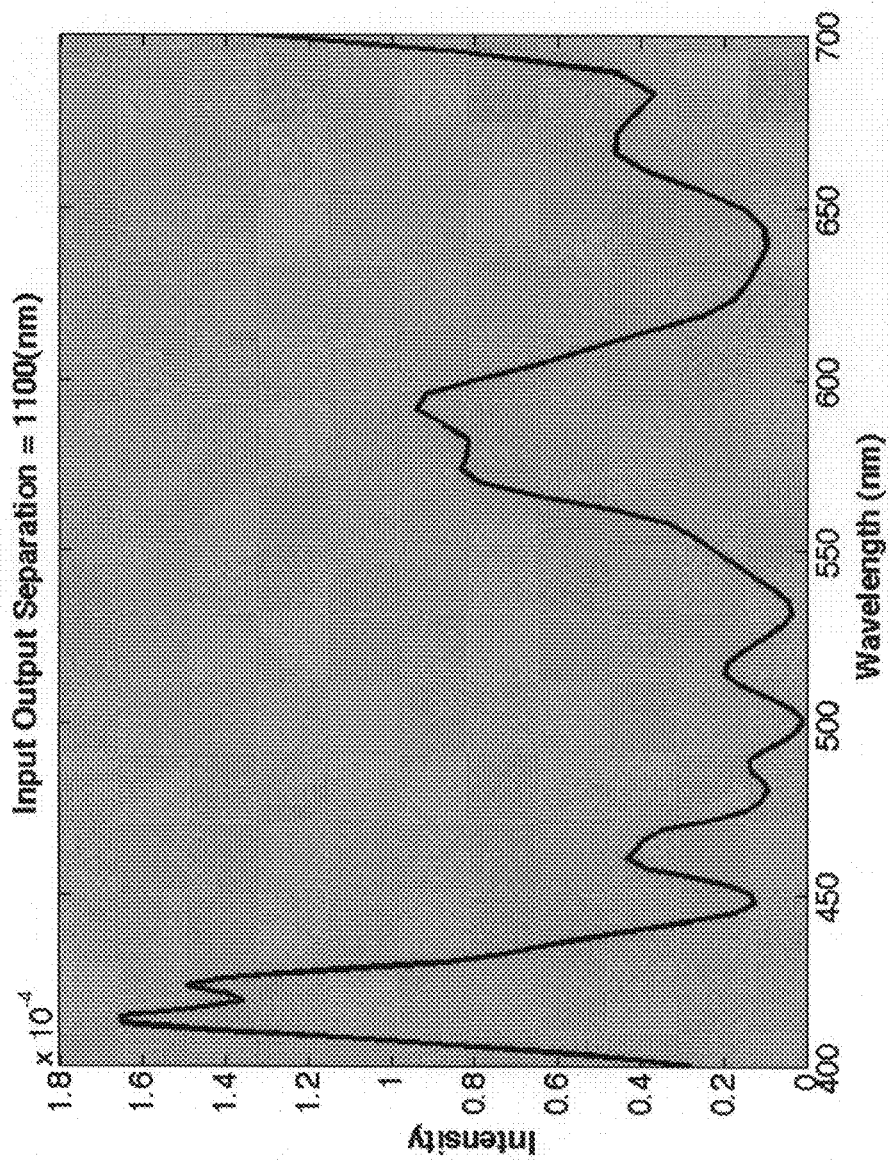
FIGS. 4B, 4C, and 4D illustrate spectrums of colored light output by waveguides pursuant to embodiments of the present invention. The background color of the figure indicates the color perceived by the eye for the particular spectrum.
Figure 4C:
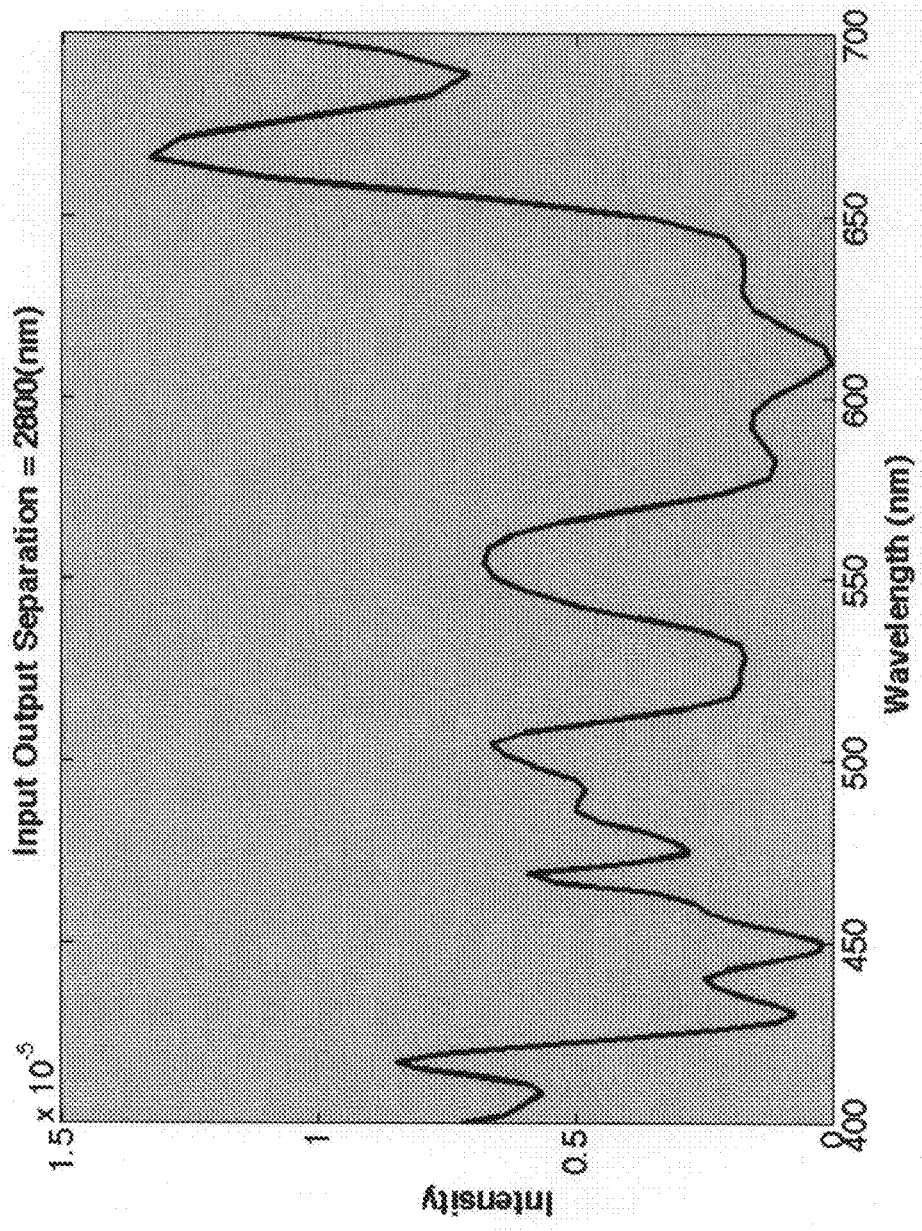
Figure 4D:
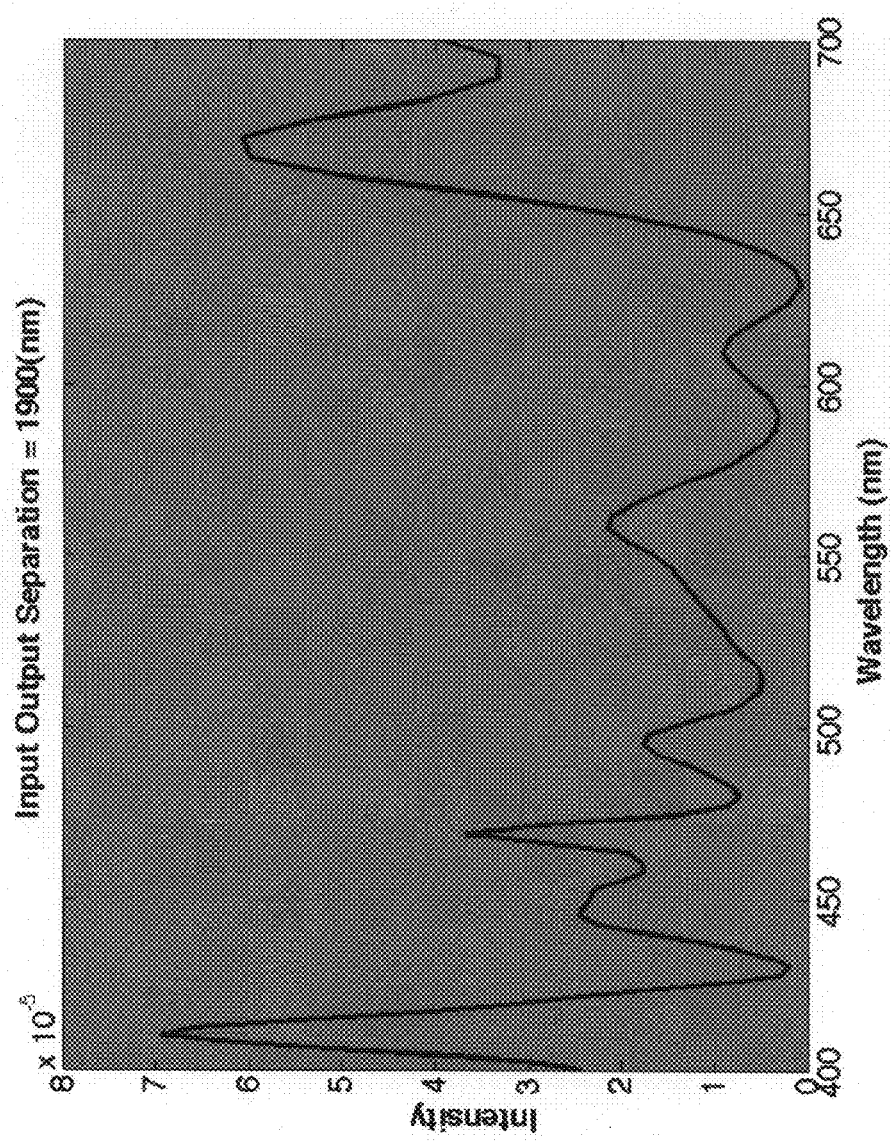

Here, as envisioned, a waveguide as shown in FIG. 4A and according to an embodiment of the present invention should act as a light filter/resonator between optical input and output slits. That is, white light in should give a single (individual) color out (e.g., spectrums as shown in FIG. 4B, 4C, or 4D).

Also, applying a voltage (or field) though a power source should modulate the refractive index of the dielectric layer shown to be formed of lithium niobate and change the output color. That is, the application of an electric field to a sample effectively changes its complex refractive index, which includes both the real refractive index and the imaginary refractive index. In the case of lithium niobate, the complex refractive index is modulated substantially through an electro-optic effect. By contrast, in the case of silicon nitrate, the complex refractive index is modulated through a carrier density modulation.

Figure 5:
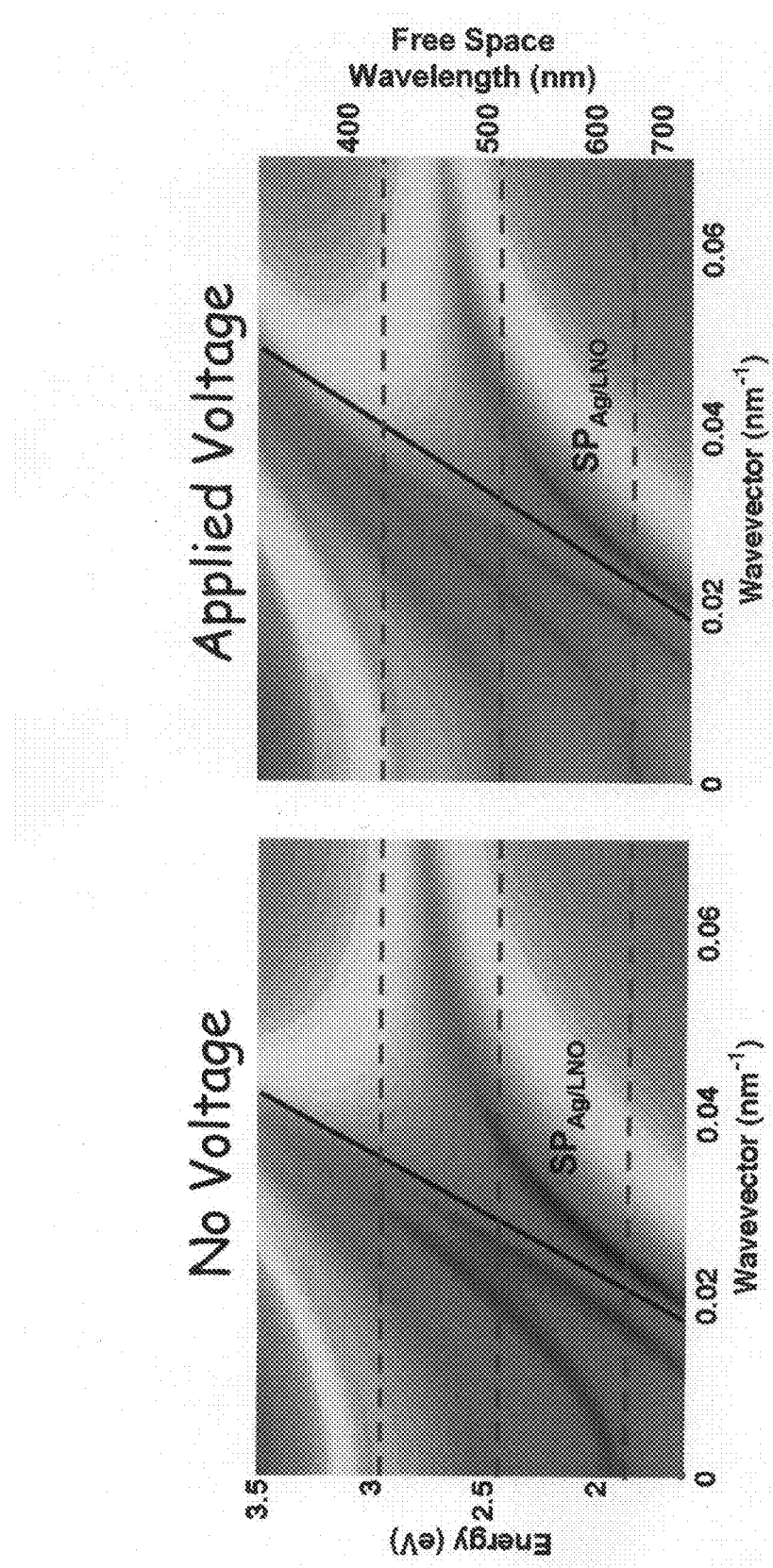
FIG. 5 is a diagram illustrating energy versus wave vector to show dispersion relations for a symmetric lithium niobate waveguide with Ag on each side.

FIG. 5 is a diagram illustrating energy versus change in wave vector to show dispersion relations for the symmetric, Ag-clad $LiNbO_3$ structure with and without an applied voltage (or field). Here, three (3) photonic and (1) plasmonic modes are supported within the 400-700 nm range of a broadband light source, and shifts in the mode indicies and losses give rise to changes in the output standing wave pattern. In addition, designing the structure thickness and materials can also modify the modes that propagate with and without an applied field. Moreover, standing waves can be observed in both the Ex and Hz fields from a broad band source sent through the input slit of the waveguide because the lithium niobate layer (slab) interposed between the two silver (Ag) layers acts as a multi-mode photonic and plasmonic waveguide.

As such, in view of the foregoing and referring also to FIGS. 4A, 4B, 4C, and 4D, specific input-output slit spacings can give red, green, and blue "pixels." In addition, these devices are less than 3 μm in length. By comparison, a typical HD TFT display's pixels are 258 μm.

Figure 6:
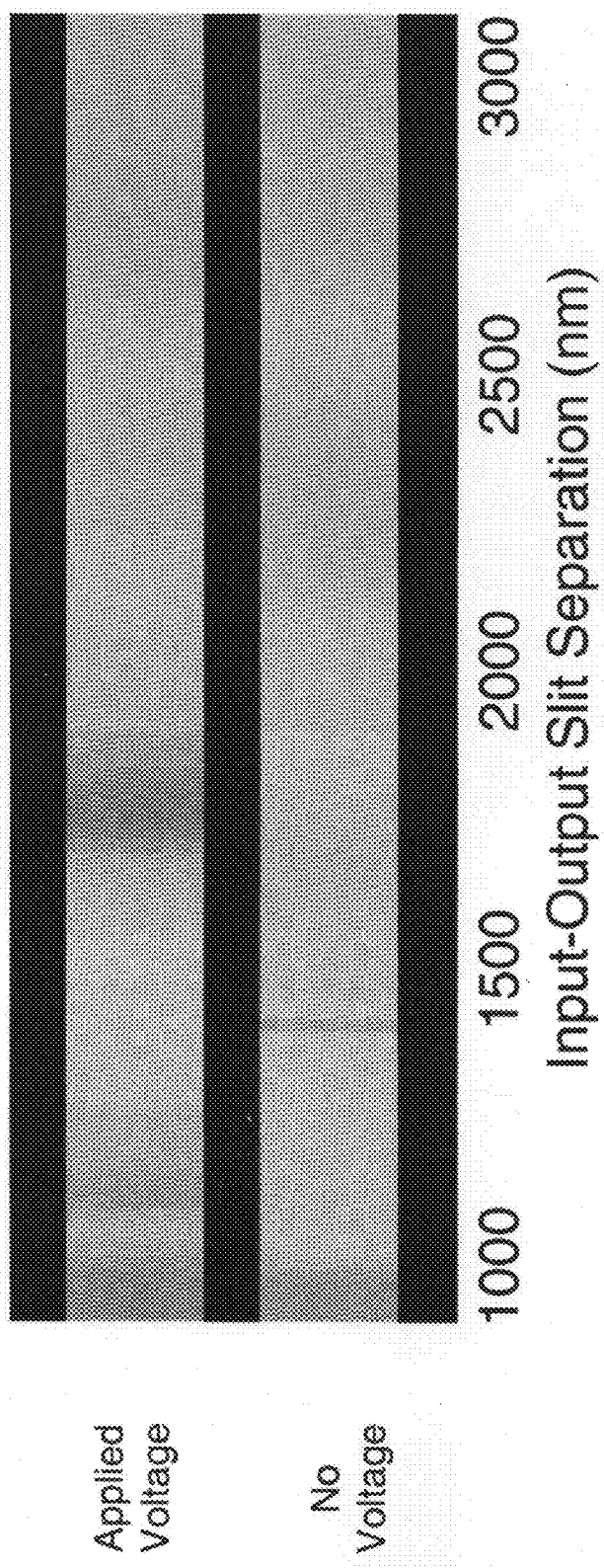
FIG. 6 shows spectrums that were calculated with and without an applied field of waveguides with a lithium niobate dielectric layer with various input-output slit separations according to embodiments of the present invention.

FIG. 6 shows spectrums that were calculated with and without an applied field of waveguides with a lithium niobate dielectric layer according to embodiments of the present invention. Here, depending on the input-output slit separation, multiple different types of color shifting can be observed. In addition, as shown in FIG. 6, a wider span of colors than just red, green, and blue can result.

Figure 7A:
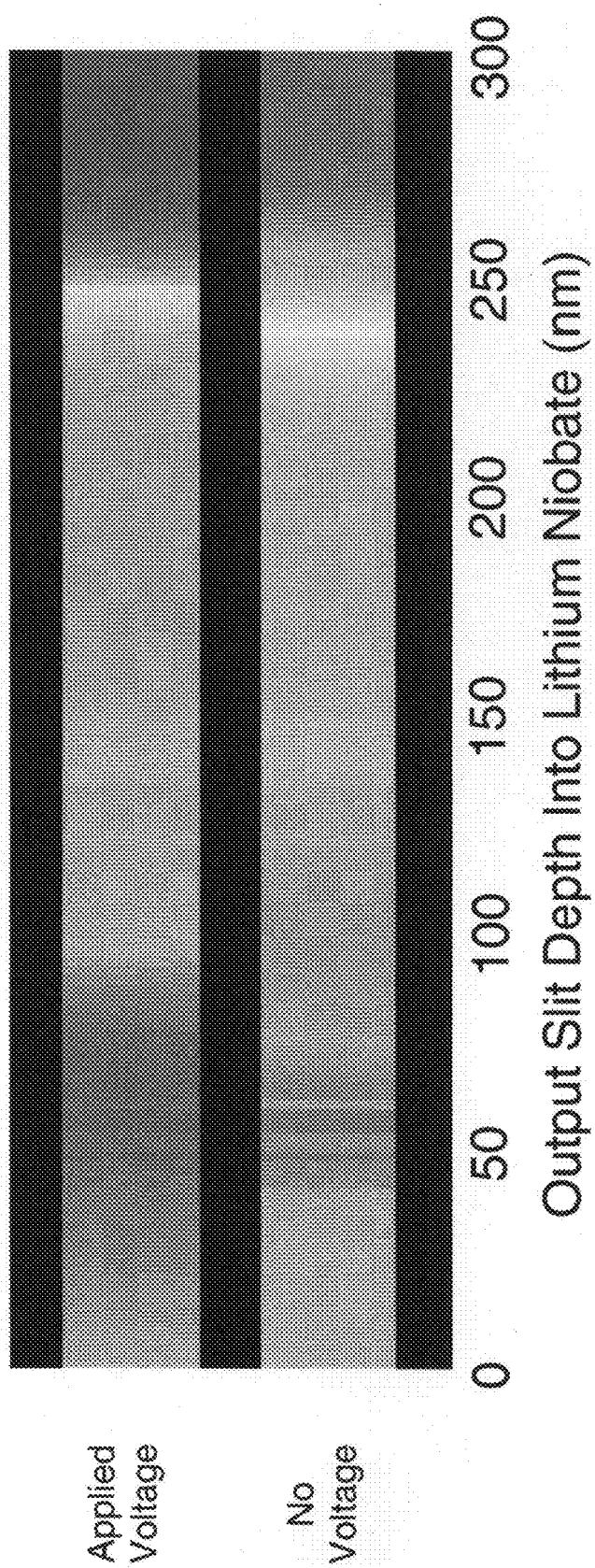
FIG. 7A shows spectrums that were calculated with and without an applied field of waveguides with various output slit depth into the lithium niobate dielectric layer according to embodiments of the present invention.
Figure 7B:
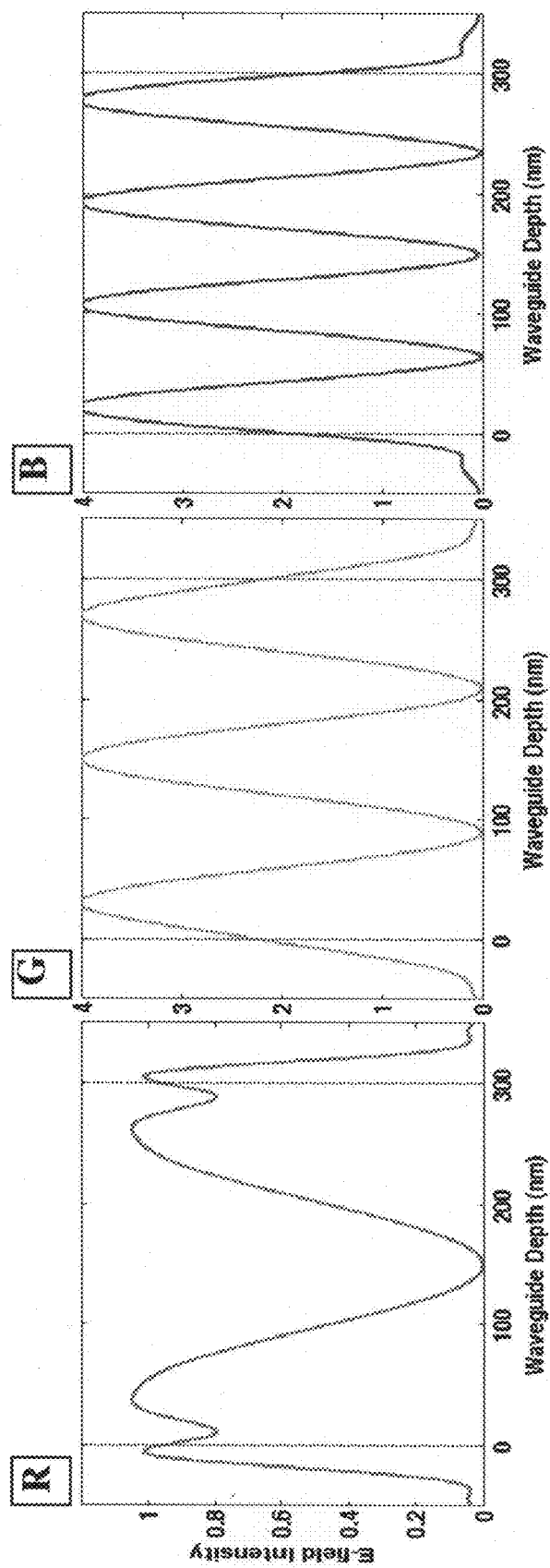
FIG. 7B illustrates that depending on the variation of the output slit depth into the lithium niobate dielectric layer (i.e., waveguide depth), red (R), green (G), or blue (B) colored light can be selected for output, corresponding to the various waveguide modes of the structure.

FIG. 7A shows spectrums that were calculated with and without an applied field of waveguides with various output slit depth into the lithium niobate dielectric layer according to embodiments of the present invention. Here, depending on the variation of the output slit depth into the lithium niobate dielectric layer, multiple different types of color shifting can also be observed. That is, as shown in FIG. 7B, depending on the variation of the output slit depth into the lithium niobate dielectric layer (i.e., waveguide depth), red (R), green (G), or blue (B) colored light can be selected for output. Moreover, as shown in FIG. 7A, a wider span of colors than just red, green, and blue can result.

Also, referring back to FIG. 2, color filtering can also be seen strongly in SiN structures with substantially the same configuration as taught above with respect to the above described embodiments with the lithium niobate structures.

Figure 8A:
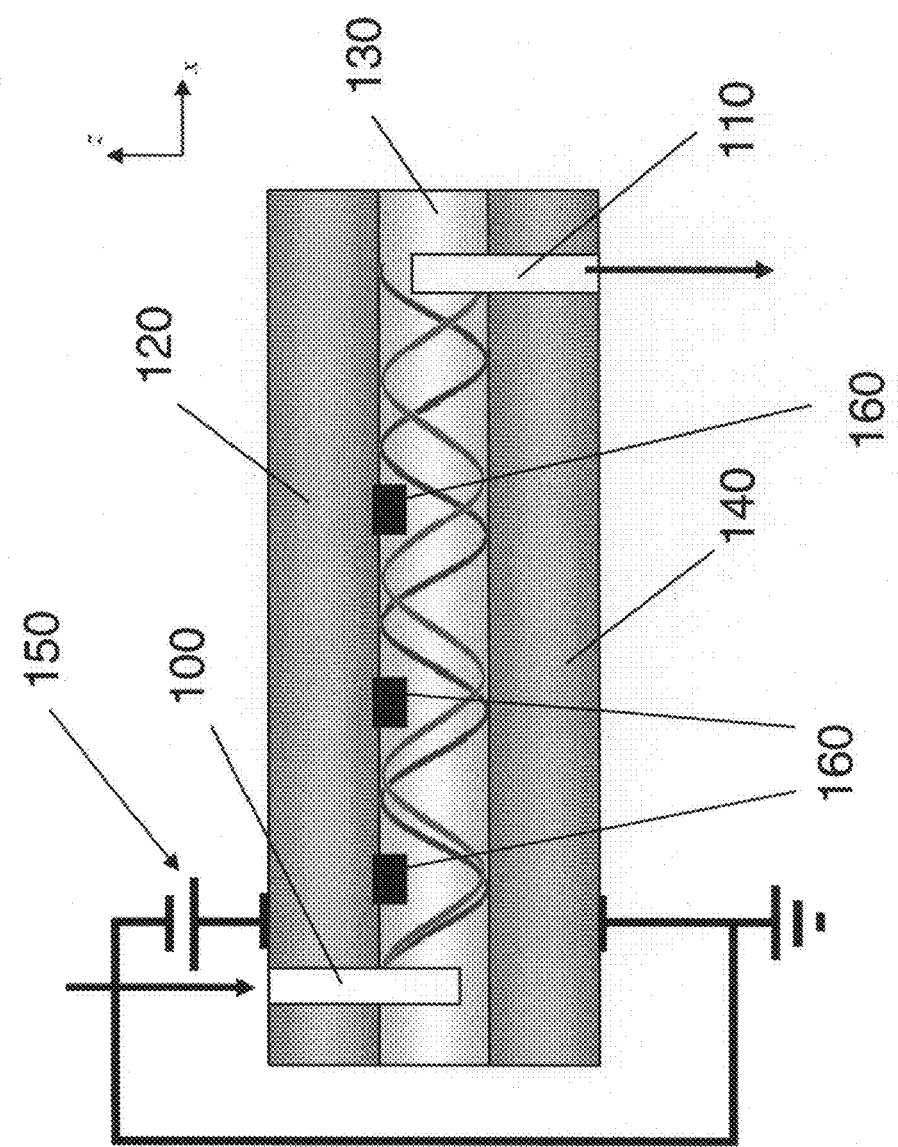
FIGS. 8A, 8B, and 8C are schematics of waveguides with notch filters according to embodiments of the present invention.
Figure 8B:
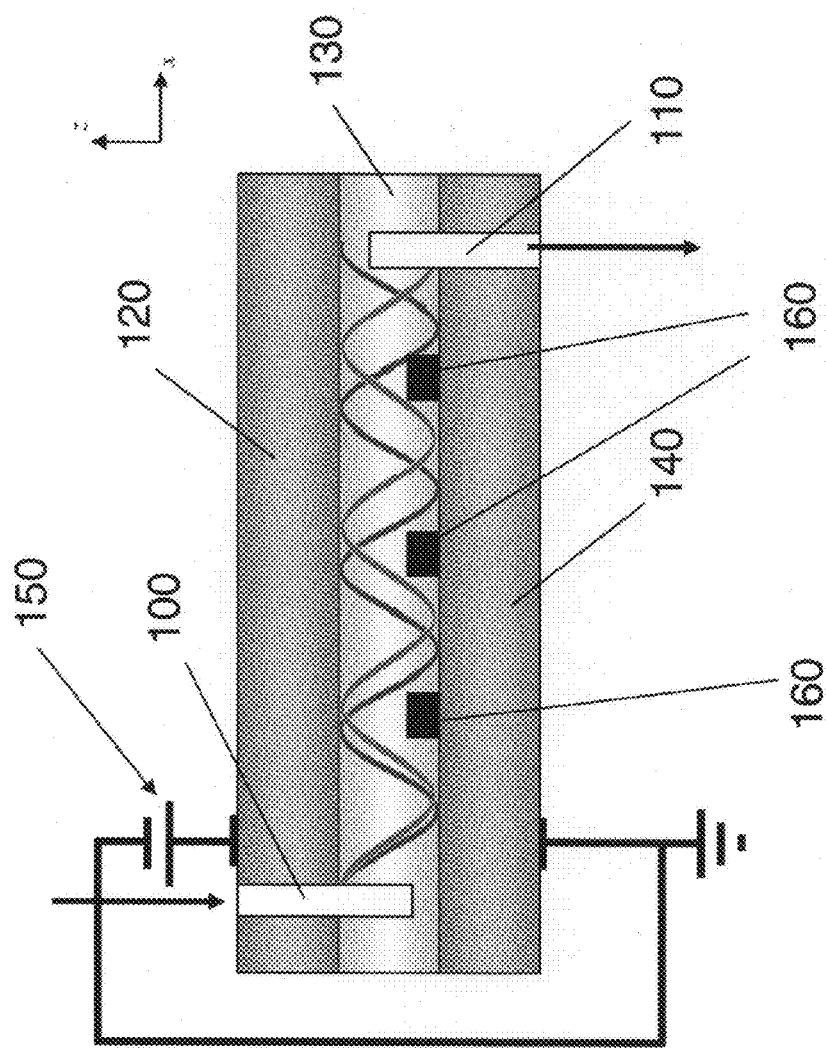
Figure 8C:
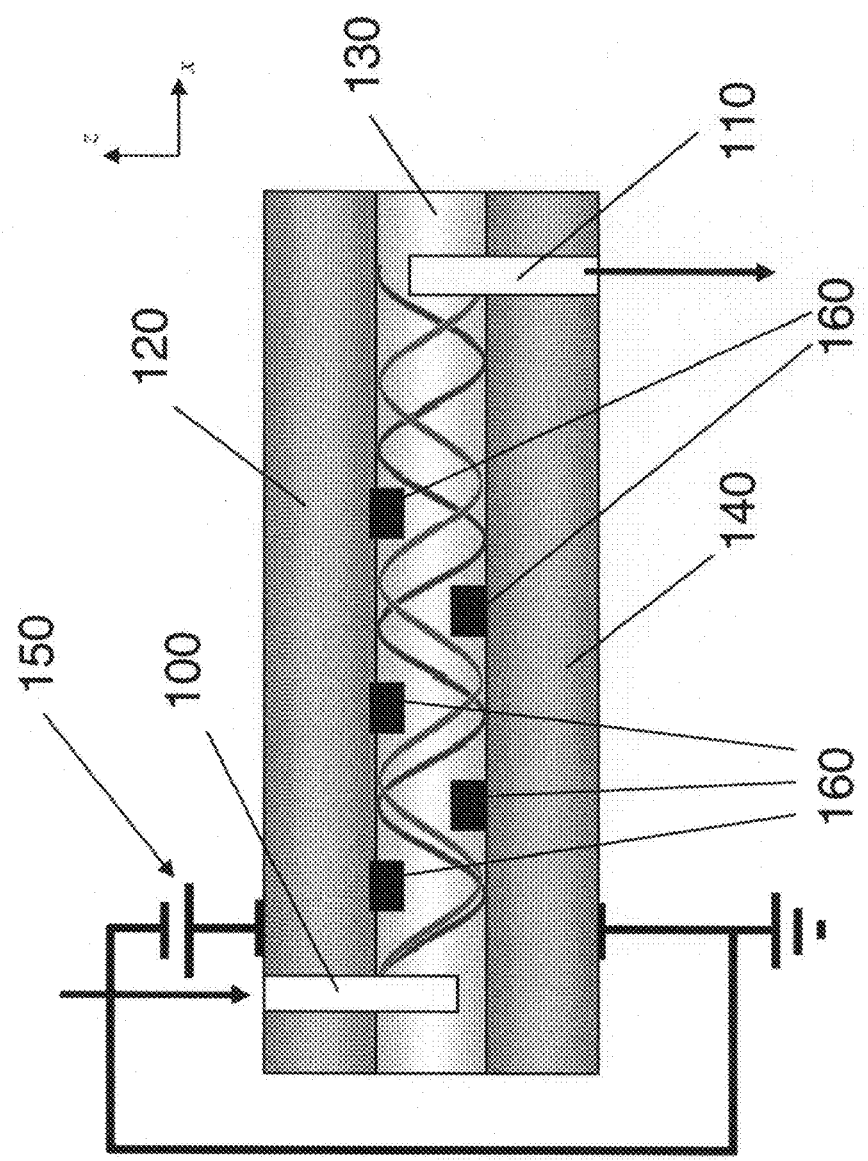

Referring now to FIGS. 8A, 8B, and 8C, the waveguide according to another embodiment of the present invention further includes a notch filter 160 between the first layer 120 and the dielectric layer 130 (FIG. 8A) or between the second layer 140 and the dielectric layer 130 (FIG. 8B) or both (FIG. 8C) to interrupt passage of undesired wavelengths of light through the dielectric layer. The notch filter 160 is formed by a plurality of notch plates for interrupting the passage of the undesired wavelengths of light through the dielectric layer 130.

Figure 9C:
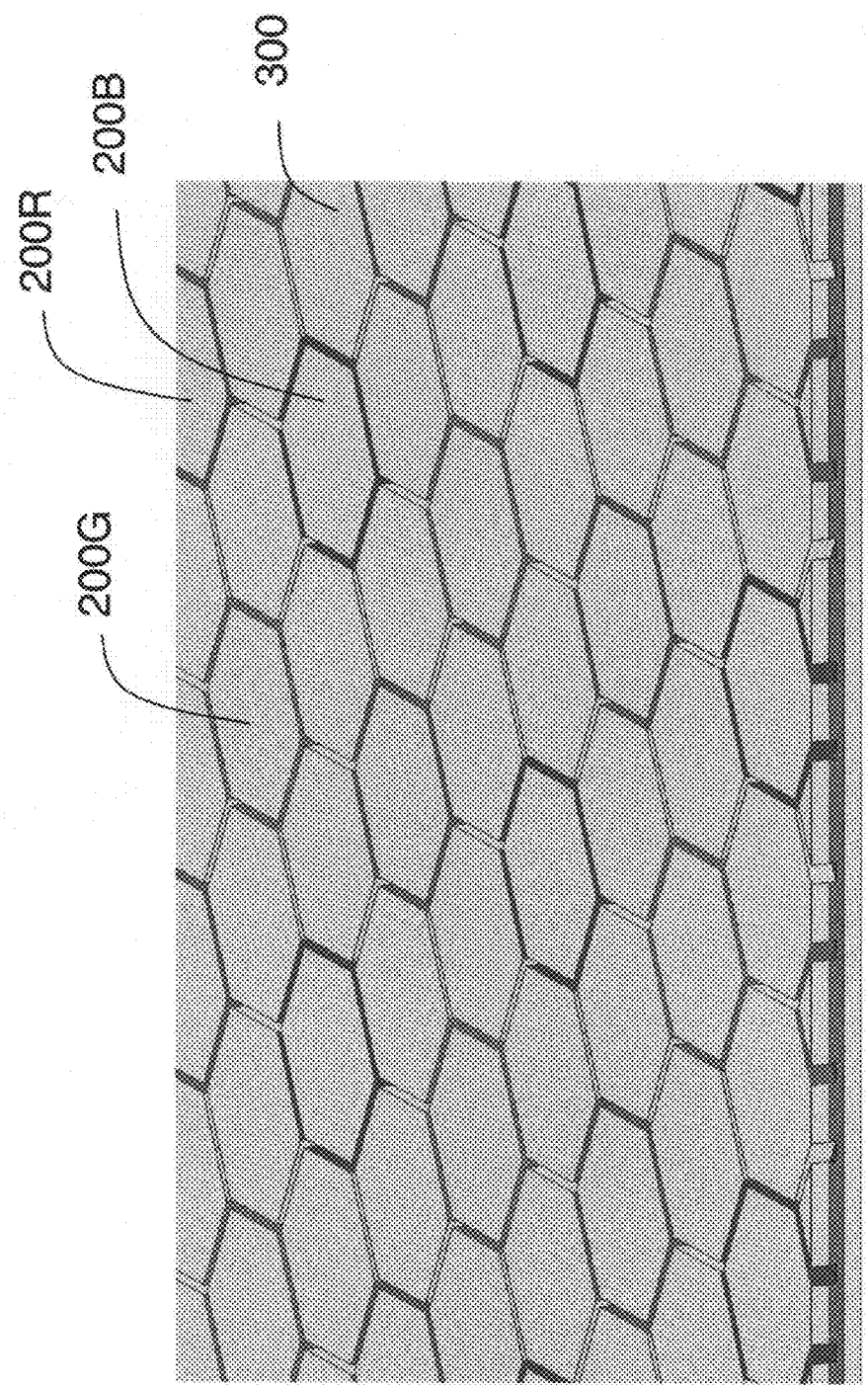

Referring to FIGS. 9A, 9B, 9C, a display according to an embodiment of the present invention that employs photonic and plasmonic slot waveguides as color-selecting elements 200G, 200B, 200R. Here, as shown in FIGS. 9A and 9C, each of the color-selecting elements 200G, 200B, 200R is hexagonal in shape and is surrounded by a plurality of non-color selecting elements 300 (also hexagonal in shape) such that the color-selecting elements 200G, 200B, 200R are separated from each other 200G, 200B, 200R by the non-color selecting elements 300. As such, referring to FIG. 9B, a white light can enter though an input 200 of a green color-selecting element 200G to output a green colored light though an output 210 of the green color-selecting element 200.

Here, the input 200 is formed by (or defined by) a plurality of input slits 500 (e.g., by six input slits 500) as shown in FIG. 11B, and the output 210 is formed by (or defined by) a plurality of output slits 510 (e.g., by six output slits 510) as shown in FIG. 11A. That is, as shown in FIGS. 11A and 11B, each of the color-selecting elements 200G, 200B, 200R according to an embodiment of the present invention is formed by (or defined by) a plurality of waveguides 600 (e.g., by six waveguides 600). Each of the waveguides 600 include an input slit 500 on a first side of the waveguide 600 (FIG. 11B), and an output slit 510 on the other side of the waveguide 600 facing oppositely away from the first side (FIG. 11A). Here, in one embodiment and shown in FIGS. 11A and 11B, the input slit 500 is narrower than the output slit 510 to account for the dispersion of light entering the input slit 500 and going through the dielectric layer between the two cladding layers.

Figure 10C:
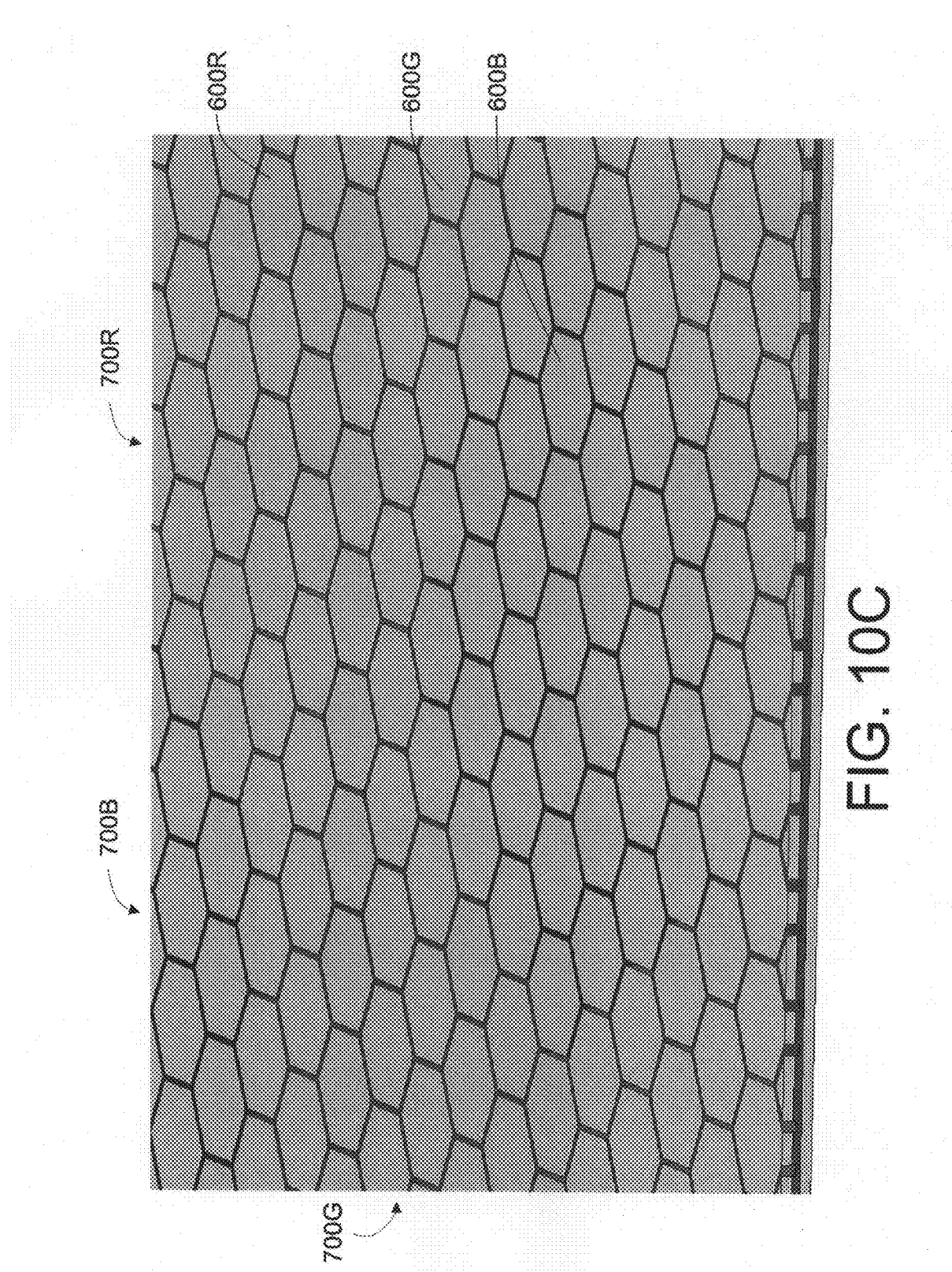

Referring to FIGS. 10A, 10B, 10C, a display according to another embodiment of the present invention that employs photonic and plasmonic slot waveguides as color-selecting elements 600G, 600B, 600R. Here, as shown in FIGS. 10A and 10C, each of the color-selecting elements 600G, 600B, 600R is hexagonal in shape.

In addition, as shown in FIGS. 10A and 10C, a plurality of red color-selecting elements 600R are grouped together to form a red pixel 700R that is, e.g., also hexagonal in shape. Here, in FIGS. 10A and 10C, 37 red color-selecting elements 600R are utilized to form the red pixel 700R, but the present invention is not thereby limited.

Further, a plurality of green color-selecting elements 600G are grouped together to form a green pixel 700G. Here, in FIGS. 10A and 10C, 37 green color-selecting elements 600G are utilized to form the green pixel 700G, but the present invention is not thereby limited.

Moreover, a plurality of blue color-selecting elements 600B are grouped together to form a blue pixel 700B. Here, in FIGS. 10A and 10C, 37 blue color-selecting elements 600B are utilized to form the blue pixel 700B, but the present invention is not thereby limited.

As such, referring to FIG. 10B, a white light can enter though an input 600 of a green color-selecting element 600G to output a green colored light though an output 610 of the green color-selecting element 200. Here, as in the embodiment of FIGS. 9A, 9B, 9C, 11A, and 11B, the input 600 is formed by (or defined by) a plurality of input slits, and the output 610 is formed by (or defined by) a plurality of output slits. That is, each of the color-selecting elements 200G, 200B, 200R according to an embodiment of the present invention is formed by (or defined by) a plurality of waveguides. Also, in each waveguide, the input slit may be of equal or lesser in length than the output slit to account for the dispersion of light entering the input slit and going through the dielectric layer between the two cladding layers.

In view of the foregoing, a mechanism for color filtering from a white light source according to an embodiment of the present invention is shown and implemented in a MIM waveguide structure. In addition, it is shown that using an active waveguide material allows significant modulation of the output color spectrum. Further, devices output a color spectrum rather than a single wavelength which can not only give RBG output, but could possibly form the basis for a color display with a much wider spectral range. That is, a photonic and plasmonic slot waveguide according to an embodiment of the present invention provides a full color display with an improved color palette. That is, the resonant display could produce emission of any arbitrary wavelength, as determined by the slit spacings and depths in the resonator.

Also, in view of the foregoing, a photonic and plasmonic slot waveguide according to an embodiment of the present invention provides a full color display with an improved response time because while liquid crystal display response times are in the millisecond regime, index modulation in a dielectric layer use the dielectric resonator is typically sub-nanosecond.

A photonic and plasmonic slot waveguide according to an embodiment of the present invention also provides a full color display with a competitive resolution because resolution limits of typical liquid crystal displays are on the order of 0.25 mm. The display presented here using the photonic and plasmonic slot waveguide can achieve resolution limits that are at least an order of magnitude smaller, as typical resonator dimensions do not exceed 10 microns.

A photonic and plasmonic slot waveguide according to an embodiment of the present invention also provides a full color display with a large viewing angle. That is, in typical liquid crystal displays, a significant fraction of the manufacturing cost arises from deposition of multi-layer stacks on tope of the active layer; such layers are required to produce a wide viewing angle. In the display presented here using the photonic and plasmonic slot waveguide, such layers would not be necessary.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A slot waveguide utilized as a color-selecting element, the slot waveguide comprising:

a first layer of plasmon supporting material, the first layer being optically opaque and having an input slit extending through the first layer;

a second layer of plasmon supporting material facing the first layer and separated from the first layer by a first distance in a first direction, the second layer being optically opaque and having an output slit extending through the second layer and separated from the input slit by a second distance extending along a second direction differing from first direction;

a dielectric layer interposed between the first layer and the second layer, the dielectric layer having a real or complex refractive index; and a power source electrically coupled to the first layer and the second layer to apply an electrical signal for modulation of the real or complex refractive index of the dielectric layer.

2. The slot waveguide of claim 1, wherein the input slit is adapted to receive a white light, and wherein the output slit is adapted to output colored light.

3. The slot waveguide of claim 2, wherein the second distance between the input slit and the output slit is configured to select a color of the outputted light.

4. The slot waveguide of claim 3, wherein the second distance ranges from about 500 nm to about 5 um.

5. The slot waveguide of claim 2, wherein the output slit has an input end facing the first layer with a third distance therebetween and extending along the first direction, and wherein the third distance is configured to select a color of the outputted light.

6. The slot waveguide of claim 1, wherein: an interface between the first layer and the dielectric layer supports a first surface plasmon mode; an interface between the second layer and the dielectric layer supports a second plasmon mode; the first layer, the second layer, and the dielectric layer support one or multiple propagating waveguide modes; and a combination of the plasmon modes and the waveguide modes is utilized to select a color of the outputted light.

7. The slot waveguide of claim 1, wherein the power source is a voltage source.

8. The slot waveguide of claim 1, wherein the applied electrical signal is an applied voltage, and wherein the real or complex refractive index of the dielectric layer is modulated by an electric field resulting from the applied voltage.

9. The slot waveguide of claim 1, wherein the dielectric layer comprises a material capable of being modulated through an electro-optic effect.

10. The slot wave guide of claim 9, wherein the dielectric material is a ferroelectric material.

11. The slot waveguide of claim 10, wherein the ferroelectric material comprises a material selected from the group consisting of lithium niobate, barium titanate, lead titanate, and combinations thereof.

12. The slot waveguide of claim 1, wherein the dielectric layer comprises a material capable of being modulated though a carrier density modulation.

13. The slot wave guide of claim 11, wherein the dielectric material is an electro-optically-switchable semiconductor.

14. The slot wave guide of claim 11, wherein the electro-optically-switchable semiconductor is crystalline silicon.

15. The slot waveguide of claim 1, wherein the first layer or the second layer is a metal layer.

16. The slot waveguide of claim 15, wherein the metal layer comprises a metal selected from the group consisting of gold, silver, copper, aluminum, tin, and combinations thereof.

17. The slot waveguide of claim 1, wherein the first layer, the second layer, or the dielectric layer has a thickness ranging from about 100 nm to about 1 um.

18. The slot waveguide of claim 1, wherein each of the first layer, the second layer, and the dielectric layer has the same shape.

19. The slot waveguide of claim 1, further comprising a notch filter between the first layer and the dielectric layer or between the second layer and the dielectric layer to interrupt passage of undesired wavelengths of light though the dielectric layer.

20. The slot waveguide of claim 19, wherein the notch filter comprises a plurality of notch plates for interrupting the passage of the undesired wavelengths of light though the dielectric layer.

* * * * *

UNITED STATES PATENT AND TRADEMARK OFFICE
CERTIFICATE OF CORRECTION

PATENT NO. : 7,925,122 B2
APPLICATION NO. : 12/215330
DATED : April 12, 2011
INVENTOR(S) : Kenneth A. Diest et al.

It is certified that error appears in the above-identified patent and that said Letters Patent is hereby corrected as shown below:

| | |
|---|---|
| Column 10, Claim 12, line 16 | Delete "though" Insert -- through -- |
| Column 10, Claim 19, line 35 | Delete "though" Insert -- through -- |
| Column 10, Claim 20, line 39 | Delete "though" Insert -- through -- |

Signed and Sealed this
Twenty-ninth Day of November, 2011

David J. Kappos
*Director of the United States Patent and Trademark Office*